US007908351B2

(12) United States Patent
Yoshida

(10) Patent No.: US 7,908,351 B2

(45) Date of Patent: Mar. 15, 2011

(54) ADMINISTRATION SYSTEM, ADMINISTRATION APPARATUS, RELAY SERVER, ADMINISTRATED APPARATUS AND ADMINISTRATION METHOD

(75) Inventor: Tomoya Yoshida, Tokyo (JP)

(73) Assignee: Konica Corporation, Tokyo (JP)

( * ) Notice: Subject to any disclaimer, the term of this patent is extended or adjusted under 35 U.S.C. 154(b) by 2261 days.

(21) Appl. No.: 10/057,364

(22) Filed: Jan. 24, 2002

(65) Prior Publication Data

US 2002/0103901 A1 Aug. 1, 2002

(30) Foreign Application Priority Data

Jan. 30, 2001 (JP) ................................. 2001-021448

(51) Int. Cl.
*G06F 15/16* (2006.01)
*G06F 15/177* (2006.01)
*G06F 3/12* (2006.01)

(52) U.S. Cl. ........ 709/223; 709/203; 709/220; 709/221; 358/1.15

(58) Field of Classification Search .................. 709/203, 709/217–224; 358/1.15
See application file for complete search history.

(56) References Cited

U.S. PATENT DOCUMENTS 5,414,494 A 5/1995 Aikens et al.
5,580,177 A 12/1996 Gase et al.
5,748,880 A 5/1998 Ito et al.
5,819,110 A * 10/1998 Motoyama ...................... 710/15
5,828,864 A 10/1998 Danknick et al.
5,878,256 A * 3/1999 Bealkowski et al. ............. 713/2
5,887,216 A * 3/1999 Motoyama ........................ 399/8
5,893,005 A 4/1999 Ogura
6,031,623 A 2/2000 Smith et al.
6,240,456 B1 * 5/2001 Teng et al. .................... 709/230
6,337,745 B1 1/2002 Aiello, Jr. et al.
6,362,870 B2 * 3/2002 Mui et al. ........................ 355/24
6,384,926 B2 5/2002 Mochizuki
6,401,116 B1 * 6/2002 Okigami ....................... 709/223
6,473,788 B1 10/2002 Kim et al.

(Continued)

FOREIGN PATENT DOCUMENTS

EP 0 478 343 A2 4/1992

(Continued)

OTHER PUBLICATIONS

Noaki Ura et al; "Remote Maintenance Function for Distributed Control System", Advances in Instrumentation and Control, Instrument Society of America, Research Triangle Park, U.S., vol. 48, No. Part 3, 1993, pp. 1557-1564, XP000428425, ISSN: 1054-0032—entire document.

(Continued)

*Primary Examiner* — Joshua Joo

(74) *Attorney, Agent, or Firm* — Holtz, Holtz, Goodman & Chick, PC

(57) ABSTRACT

An administration system, including an administrated machine, such as a copying machine, for being administrated; and an administration machine, connected with the administrated machine through communication lines, for administrating the administrated machine. The administrated machine further includes: a) a trouble type judging section for detecting a trouble caused on the administrated machine and for judging a type of the trouble. In the administration system, the administrated machine makes the administration machine, connected to the communication lines, obtain trouble type information corresponding to the trouble type judged by the trouble type judging section; and the administration machine makes the administrated machine to obtain, based on the trouble type information, restoration work information stored in advance to be in connection with the trouble type information.

17 Claims, 6 Drawing Sheets

31
SERVER
N
WWW INTERNET
FIRST TRANSFER INFORMATION
FIRST TRANSFER INFORMATION
12
22
SECOND TRANSFER INFORMATION
SECOND TRANSFER INFORMATION
P
PROVIDER
NU
USER INTRANET
NS
SERVICE COMPANY INTRANET
21a
21
11
PN

U.S. PATENT DOCUMENTS

| | | | | |
|---|---|---|---|---|
| 6,490,052 | B1 | 12/2002 | Yanagidaira | |
| 6,519,053 | B1 | 2/2003 | Motamed et al. | |
| 6,618,162 | B1 * | 9/2003 | Wiklof et al. | 358/1.15 |
| 6,631,247 | B1 * | 10/2003 | Motoyama et al. | 399/8 |
| 6,633,400 | B1 | 10/2003 | Sasaki et al. | |
| 6,714,971 | B2 | 3/2004 | Motoyama et al. | |
| 6,788,429 | B1 | 9/2004 | Clough et al. | |
| 6,791,702 | B2 | 9/2004 | Tanaka | |
| 6,862,583 | B1 | 3/2005 | Mazzagatte et al. | |
| 6,915,337 | B1 * | 7/2005 | Motoyama et al. | 709/224 |
| 6,918,082 | B1 | 7/2005 | Gross et al. | |
| 6,970,952 | B2 * | 11/2005 | Motoyama | 710/15 |
| 7,251,686 | B1 * | 7/2007 | Tomita | 709/223 |
| 7,349,964 | B2 * | 3/2008 | Motoyama et al. | 709/224 |
| 7,356,579 | B1 * | 4/2008 | Motoyama et al. | 709/224 |
| 7,814,208 | B2 * | 10/2010 | Stephenson et al. | 709/227 |
| 2001/0054064 | A1 | 12/2001 | Kannan | |
| 2001/0055125 | A1 | 12/2001 | Yamada et al. | |
| 2003/0208569 | A1 | 11/2003 | O Brien et al. | |
| 2004/0012807 | A1 * | 1/2004 | Konishi | 358/1.15 |
| 2005/0280864 | A1 * | 12/2005 | Lodwick | 358/1.15 |

FOREIGN PATENT DOCUMENTS

| | | | |
|---|---|---|---|
| EP | 0 843 230 | A2 | 5/1998 |
| EP | 1 033 646 | A2 | 9/2000 |
| JP | 10-322396 | A | 12/1998 |
| JP | 2000-148538 | A | 5/2000 |
| JP | 2000-177219 | A | 6/2000 |

OTHER PUBLICATIONS

"Disk Drive With Embedded Hyper-Text Markup Language Server", IBM Technical Disclosure Bulletin, IBM Corp., New York, U.S., Dec. 1, 1995, p. 479, XP000588211—entire document.

The Hard Copy Observer, vol. VII, No. 3, Mar. 1997, pp. 45-46.

Ryuichi Toriyama, "System security and operation management" Nikkei Open System, Nikkei BP Company, Dec. 15, 1997, vol. 57, pp. 326-332.

* cited by examiner

FIG. 3

EXAMPLE OF SPECIFIC DATA

| | COUNT NAME | DESCRIPTION OF CONTENTS |
|---|---|---|
| COUNT-RELATED INFORMATION (COUNT FOR MACHINE MAINTENANCE AND ACCOUNTING) | TOTAL COUNT | TOTAL NUMBER OF COUNT OF RECORDING MATERIALS FOR COPYING AND PRINTING |
| | RECORDING MATERIAL COUNT | TOTAL NUMBER OF COUNT OF RECORDING MATERIALS FOR COPYING AND PRINTING |
| | RECORDING MATERIAL COUNT BY SIZE | NUMBER OF COUNT BY SIZE OF RECORDING MATERIALS USED |
| | COUNT BY SECTION (INDIVIDUAL) | NUMBER OF COUNT BY SECTION (INDIVIDUAL) WHO USES |
| | COUNT BY COPY, PRINTER, FAX AND SCANNER | NUMBER OF COUNT USED BY MODE |
| | COUNT BY MODE USED BY USER | NUMBER OF COUNT BY MODE USED BY USER (TWO-SIDED/SINGLE-SIDED, STAPLE AND OTHERS) |
| | NUMBER OF SHEETS PASSING THROUGH ADF | NUMBER OF ORIGINALS TO BE COPIED PASSING THROUGH ADF |
| | PM COUNT | COUNT USED AS STANDARD FOR PERIODIC CHECK OF SERVICE ENGINEER |
| | DRUM COUNT | COUNT OF USED DRUMS |
| | COUNT OF OPTIONAL REPLACEMENT PARTS | COUNT OF USED PARTS ASSIGNED OPTIONALLY BY SERVICE ENGINEER (USED AS STANDARD FOR REPLACEMENT TIME) |
| | COUNT OF FIXED REPLACEMENT PARTS | COUNT OF USED PARTS DETERMINED IN SHIPMENT FROM FACTORY (USED AS STANDARD FOR REPLACEMENT TIME) |
| INFORMATION FOR DISCRIMINATING COPYING MACHINE (INFORMATION USED BY HOST TO DISCRIMINATE AND ADMINISTRATE COPYING MACHINE) | MAIN BODY SERIAL NUMBER | PRODUCTION NUMBER OF MACHINE BODY |
| | OPTION SERIAL NUMBER | PRODUCTION NUMBER OF OPTION |
| | STRUCTURAL INFORMATION OF OPTION | STRUCTURAL INFORMATION OF INSTALLED OPTION |
| | MAIN BODY ROM VERSION | VERSION INFORMATION OF CONTROL PROGRAM |
| | OPTION ROM VERSION | VERSION INFORMATION OF CONTROL PROGRAM |
| URGENT/PERIODIC CALL INFORMATION (INFORMATION IN A MOMENT WHEN COPYING MACHINE CALLED HOST) | COUNT OF URGENT/ PERIODIC CALLING | TOTAL COUNT OF COPYING MACHINE IN A MOMENT WHEN HOST IS CALLED |
| | DATE AND HOUR OF URGENT/PERIODIC CALLING | DATE AND HOUR OF CALLING HOST |
| | CONTENTS OF URGENT/ PERIODIC CALLING | CONTENTS IN A MOMENT WHEN HOST IS CALLED |
| INFORMATION OF SETTING PERIODIC CALL | PERIODIC COUNT CALL SETTING | SETTING INFORMATION FOR CALLING HOST FOR EVERY PERIODIC CALL |
| | PERIODIC DATE AND HOUR CALL SETTING | SETTING INFORMATION FOR CALLING HOST FOR EVERY PERIODIC DATE AND HOUR |
| | | |
| JAM/SC INFORMATION (PAPER JAM/SERVICE CALL INFORMATION) | JAM/SC COUNT | FREQUENCY OF OCCURRENCE OF JAM/SC |
| | DATE AND HOUR OF JAM/ SC OCCURRENCE | DATE AND HOUR OF OCCURRENCE OF JAM/SC |
| | JAM/SC CONTENTS | INFORMATION INCLUDING LOCATION OF OCCURRENCE OF JAM/SC |
| | JAM/SC HISTORY | HISTORY INFORMATION OF DATE AND HOUR AND CONTENTS OF JAM/SC OCCURRENCE |
| ADJUSTMENT DATA (PARAMETER FOR EACH CONTROL) | MACHINE ADJUSTMENT DATA | PARAMETER FOR MACHINE CONTROL (IMAGE QUALITY ETC.) |
| | FAX COMMUNICATION FUNCTION SETTING | PARAMETER FOR FAX COMMUNICATION CONTROL |
| | SYSTEM SETTING DATA | PARAMETER FOR CONTROL OF REMOTE DIAGNOSIS SYSTEM |
| COMMUNICATION HISTORY | COMMUNICATION CONTROL REPORT | COMMUNICATION LOG INFORMATION FOR FAX/REMOTE DIAGNOSIS |
| USER SETTING DATA | USER SETTING DATA | DATA SET BY USER (ABBREVIATED DIAL ETC.) |
| VARIOUS SETTING DATA | HOST SELECTION NUMBER | ELECTION INFORMATION SUCH AS TELEPHONE NUMBER (TELEPHONE NUMBER, IP ADDRESS, URL ETC.) |
| | HOST SELECTION NUMBER | CORRESPONDING MACHINE, HOST DISCRIMINATION PASSWORD FOR SECURITY |

Figure 4:
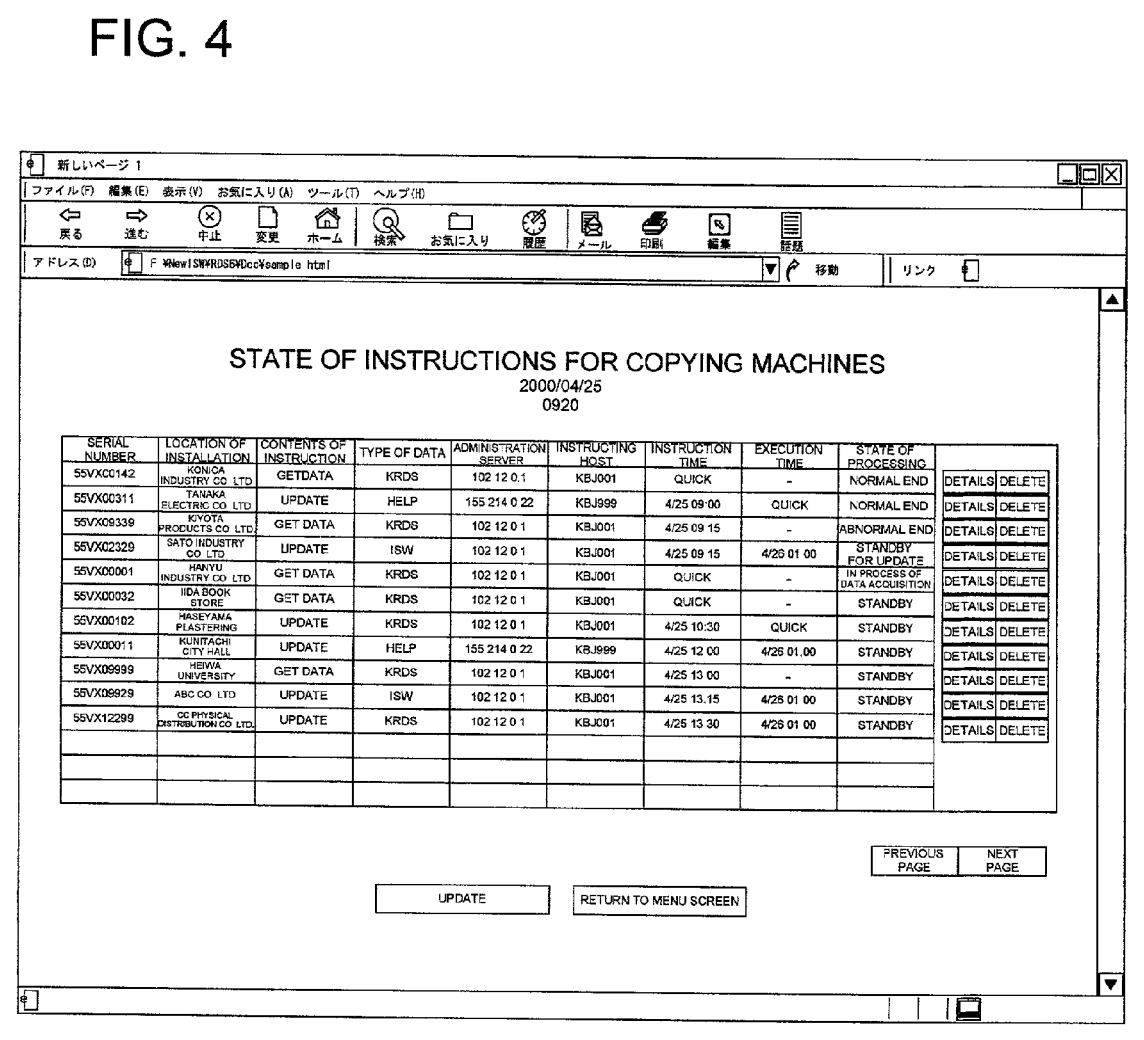

アドレス(D) F ¥NewISW¥RDS6¥Doc¥sample html 移動 リンク

STATE OF INSTRUCTIONS FOR COPYING MACHINES

2000/04/25

0920

| SERIAL NUMBER | LOCATION OF INSTALLATION | CONTENTS OF INSTRUCTION | TYPE OF DATA | ADMINISTRATION SERVER | INSTRUCTING HOST | INSTRUCTION TIME | EXECUTION TIME | STATE OF PROCESSING | | |
|---|---|---|---|---|---|---|---|---|---|---|
| 55VXC0142 | KONICA INDUSTRY CO LTD | GETDATA | KRDS | 102 12 0.1 | KBJ001 | QUICK | - | NORMAL END | DETAILS | DELETE |
| 55VX00311 | TANAKA ELECTRIC CO LTD | UPDATE | HELP | 155 214 0 22 | KBJ999 | 4/25 09:00 | QUICK | NORMAL END | DETAILS | DELETE |
| 55VX09339 | KIYOTA PRODUCTS CO LTD | GET DATA | KRDS | 102 12 0 1 | KBJ001 | 4/25 09 15 | - | ABNORMAL END | DETAILS | DELETE |
| 55VX02329 | SATO INDUSTRY CO LTD | UPDATE | ISW | 102 12 0 1 | KBJ001 | 4/25 09 15 | 4/26 01 00 | STANDBY FOR UPDATE | DETAILS | DELETE |
| 55VX00001 | HANYU INDUSTRY CO LTD | GET DATA | KRDS | 102 12 0 1 | KBJ001 | QUICK | - | IN PROCESS OF DATA ACQUISITION | DETAILS | DELETE |
| 55VX00032 | IIDA BOOK STORE | GET DATA | KRDS | 102 12 0 1 | KBJ001 | QUICK | - | STANDBY | DETAILS | DELETE |
| 55VX00102 | HASEYAMA PLASTERING | UPDATE | KRDS | 102 12 0 1 | KBJ001 | 4/25 10:30 | QUICK | STANDBY | DETAILS | DELETE |
| 55VX00011 | KUNITACHI CITY HALL | UPDATE | HELP | 155 214 0 22 | KBJ999 | 4/25 12 00 | 4/26 01.00 | STANDBY | DETAILS | DELETE |
| 55VX09999 | HEIWA UNIVERSITY | GET DATA | KRDS | 102 12 0 1 | KBJ001 | 4/25 13 00 | - | STANDBY | DETAILS | DELETE |
| 55VX09929 | ABC CO LTD | UPDATE | ISW | 102 12 0 1 | KBJ001 | 4/25 13.15 | 4/26 01 00 | STANDBY | DETAILS | DELETE |
| 55VX12299 | CC PHYSICAL DISTRIBUTION CO LTD. | UPDATE | KRDS | 102 12 0 1 | KBJ001 | 4/25 13 30 | 4/26 01 00 | STANDBY | DETAILS | DELETE |
| | | | | | | | | | | |
| | | | | | | | | | | |
| | | | | | | | | | | |

PREVIOUS PAGE NEXT PAGE

UPDATE RETURN TO MENU SCREEN

ADMINISTRATION SYSTEM, ADMINISTRATION APPARATUS, RELAY SERVER, ADMINISTRATED APPARATUS AND ADMINISTRATION METHOD

BACKGROUND OF THE INVENTION

The present invention relates to an administration technology capable of administrating an administrated apparatus through a network.

For example, there is known a technology to monitor an image forming apparatus such as a copying machine, on a remote control basis. To be more concrete, a copying machine is connected with an administration center through wireless or wire circuit public lines, and when troubles are caused, a report is submitted from the copying machine to the administration center.

In the conventional technology of this kind, even when a user does not notify the state of affairs of troubles on the copying machine to the administration center, the administration center can learn the troubles on its side on a timely basis, and therefore, quick actions for the troubles can be taken, which is an advantage.

However, even it is possible for the administration center to learn the contents of the troubles, if it is necessary to send a service engineer to the site of the troubles every time to restore, it is time-consuming and the user is required to wait until the service engineer arrives, without making copies, which is a problem. On the contrary, it is also considered that the administration center gives an instruction to the user through a telephone to make the user to fix the troubles. However, an ordinary user sometimes does not understand the instruction from the administration center for lack of knowledge about a copying machine, or, there is a fear in some cases that the user damages the copying machine with inappropriate handling.

SUMMARY OF THE INVENTION

The invention has been achieved in view of the problems stated above, and its object is to provide an administration system and an administration method wherein an image forming apparatus can restore itself automatically, without relying on the restoration work conducted by a service engineer who visits the site of the troubles.

The administration system of the invention is represented by an administration system having therein an administrated apparatus to be administrated and an administration means that is connected with the administrated apparatus through communication lines and administrates the administrated apparatus, wherein the administrated apparatus is equipped with a trouble type judging section which detects a trouble caused on the administrated apparatus and judges a type of the trouble, and the administrated apparatus makes the administration means, connected to the communication lines, obtain trouble type information corresponding to the trouble type judged by the trouble type judging section, while the administration means makes the administrated apparatus to obtain, based on the obtained trouble type information, restoration work information stored in advance to be corresponded to trouble type information, and thereby, the administrated apparatus which has obtained the restoration work information can conduct restoration work by itself based on the restoration work information, thus, a service engineer is not required to visit the site of the troubles, and time for maintenance can be decreased greatly.

It is preferable that the communication line stated above is an internet in the administration system of the invention because a great deal of data can be transmitted.

In the administration system of the invention, the communication lines stated above may also be general public lines.

In the administration system of the invention, if trouble type information and restoration work information are stored in the administration means as a database, a trouble type which is the same as the trouble type occurred in the past, for example, is retrieved, and there is made a reproduction of the restoration work conducted when the same type of the trouble occurred in the past, thus it is possible for the administrated apparatus to conduct automatic restoration quickly.

In the administration system of the invention, it is preferable that the administration means includes a relay server and an administration apparatus, the relay server is connected to the communication lines to store first transfer information to be transferred to the administrated apparatus or second transfer information to be transferred to the administration apparatus, the administrated apparatus accesses relay server through the communication lines to obtain first transfer information stored in the relay server or to transmit second transfer information to the relay server, the administration apparatus accesses the relay server through the communication lines to obtain second transfer information stored in the relay server or to transmit first transfer information to the relay server, and the database is stored in at least one of the relay server and the administration apparatus. For example, even in the case where a firewall is built between the administrated apparatus and the relay server, it is possible to force the administrated apparatus to transmit the second transfer information (trouble type information or the like) to the relay server by itself, by reading the first transfer information stored in the relay server. The basis for the foregoing is that the firewall allows information transfer from the inside thereof. In addition, the administrated apparatus can obtain restoration information corresponding to the trouble type information transmitted from the relay server side, which makes automatic restoration to be possible.

In the administration system of the invention, it is preferable if the restoration work information can be updated by the administration apparatus.

In the administration system of the invention, it is preferable if the administrated apparatus conducts automatic restoration work based on the restoration work information obtained.

In the administration system of the invention, the administration means can take actions including the dispatch of a service engineer, for troubles which make automatic restoration impossible, when the administration means judges whether the administrated apparatus can conduct automatic restoration by itself or not by looking up the trouble type information in the database, which is preferable.

In the administration system of the invention, when automatic restoration work is carried out, if the administrated apparatus makes the administration means to acquire the information about success or failure of the automatic restoration work to make it to be a part of the database, the information can be used for various decisions, which is preferable.

It is preferable that the administration apparatus of the invention is used for the administration system stated above.

It is preferable that the relay server of the invention is used for the administration system stated above.

The administrated apparatus of the invention is one that is administrated by the administration means connected to the communication lines and is connected to the communication lines, and it detects a trouble caused in the administrated apparatus and is equipped with a trouble type judging section that judges the type of the trouble, thus, the administrated apparatus acquires restoration work information offered in accordance with the trouble type information acquired by making the administration means connected to the communication lines to acquire the trouble type information corresponding to the type of the trouble judged by the trouble type judging section, and thereby, the administrated apparatus which has obtained the restoration work information can conduct restoration work by itself based on that restoration work information, thus, a service engineer is not required to visit the site of the troubles, and time for maintenance can be decreased greatly.

The administration method of the invention is one that administrates the administrated apparatus by using communication lines, and trouble type information corresponding to the type of a trouble that may occur in the administrated apparatus is stored to be corresponded to restoration work information, then, the trouble type information is acquired through the communication lines from the administrated apparatus when the trouble occurs, and the administrated apparatus acquires the restoration work information corresponding to the acquired trouble information through the communication lines. Thus, the administrated apparatus that has acquired the restoration information can conduct restoration operations by itself based on the restoration information, and a service engineer is not required to visit the site of the troubles, and time for maintenance can be decreased greatly.

Incidentally, "an internet" is used in a sense of a wide area network, and it is one wherein computer systems, terminals and data communication facilities are connected with each other. They may be connected through either a type of wire circuits such as private lines or public lines or a wireless type such as communication satellites, or through a complex of both of them.

In the present specification, "first transfer information" means information to be acquired by an administrated apparatus from an administration apparatus or a relay server, and "restoration work information" and "job information" are information to be included in the "first transfer information" as an example. Further, "second transfer information" means information to be acquired by the administration apparatus or the relay server from the administrated apparatus, and "trouble type information" and "specific data" are information to be included in the "second transfer information" as an example.

BRIEF DESCRIPTION OF THE DRAWINGS

FIG. 3 is a diagram showing an example of specific data.

FIG. 4 is a diagram showing an example of JOB list.

DETAILED DESCRIPTION OF THE INVENTION

Figure 1:
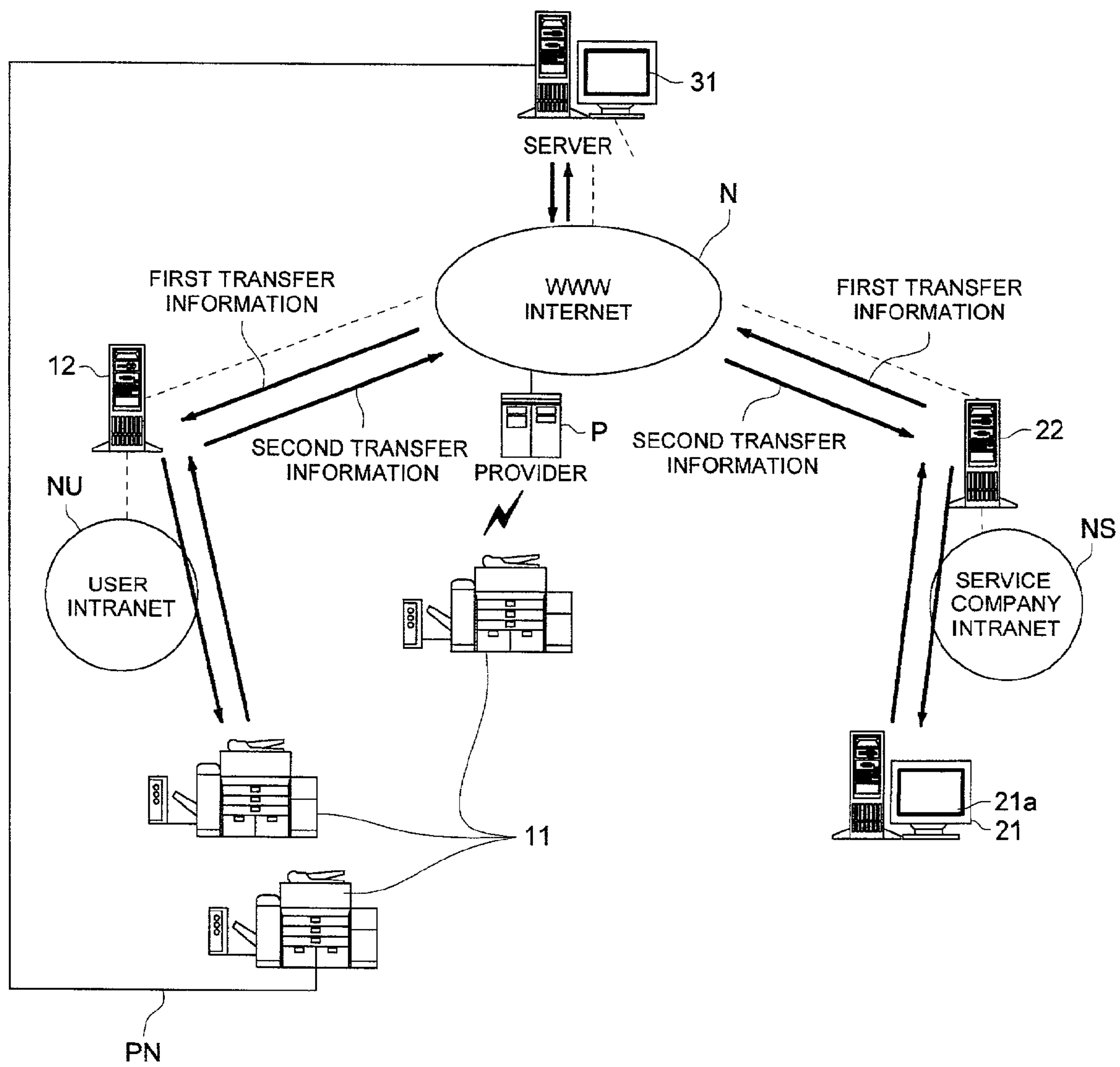
FIG. 1 is a diagram showing an administration system of the present embodiment.

The embodiment of the invention will be explained in detail as follows, referring to the drawings.

FIG. 1 is a diagram showing an administration system of the present embodiment. In FIG. 1, image forming apparatus 11 representing an administrated apparatus such as a copying machine and a printer connected to user intranet Nu built in a company of a user is connected to internet N which is out of the company, through proxy server 12 having a function of a fire wall. On the other hand, host computer 21 connected to service company intranet Ns that is built in the service company is connected to internet N that is out of the company, through proxy server 22 having a function of a fire wall. In addition, relay server 31 having a storage means (that is also called a relay storage section) such as a large capacity hard disc is connected to internet N in the same way. Namely, the image forming apparatus 11 is connected to user intranet Nu representing a user network that is different from internet N, and is connected to internet N through proxy server 12 representing a user fire wall that is connected to the user network and restricts information that passes through, while, the relay server 31 is connected to internet N outside the user fire wall when viewed from the user network. On the other hand, host computer 21 is connected to service company intranet Ns representing a service network that is different from internet N, and is connected to internet N through proxy server 22 representing a user fire wall that restricts information that passes through. Further, the relay server 31 is connected to internet N outside the service fire wall when viewed from the service network.

Image forming apparatus 11 that forms an image on a recording material constitutes an administrated apparatus and has therein an administrated storage section such as a memory, flush ROM and hard disc all capable of storing in which programs and data are stored, a detection means such as a sensor that detects troubles, and a trouble type judging section such as CPU, so that control based on programs or data stored in the administrated storage section may be conducted. Host computer 21 constitutes an administration apparatus that is capable of providing job information. Job information described later about an embodiment includes updating information for rewriting the program stored in the administrated storage section of the image forming apparatus 11 into updating program, or for rewriting the data into the updating data, and the image forming apparatus 11 can rewrite the program or data stored in the administrated storage section into updating program or updating data, based on the updating information acquired. Further, the image forming apparatus 11 can download updating program or updating data based on the updating information acquired, and can rewrite program or data stored in the administrated storage section into updating program or the aforesaid updating data. Incidentally, while, the image forming apparatus 11 is rewriting into updating program or the updating data (or, while transmitting second transmission information described later), a part of its function cannot be displayed sufficiently. It is therefore preferable to discontinue access to relay server 31.

The updating program is a program that is upgraded in version wherein bugs in the original program have been solved. The updating data means one like a default that determines density of an image, and it includes concretely specific data shown in FIG. 3. Incidentally, the following explanation is for the occasion wherein the image forming apparatus 11 is connected to internet N through user intranet Ns and proxy server 12. However, the explanation can be applied also to the image forming apparatus 11 connected to internet N through a modem that conducts conversion for digital signals and analog signals both connected to public lines (telephone lines) and through a provider connected to internet N through public lines PN. It is preferable that the image forming apparatus 11 is structured to be capable of conducting delivery and receipt of direct information (by public lines) so that the relay server 31 can provide its service even to the image forming apparatus (precisely speaking, image forming apparatus that is not connected to internet N) 11 having a modem that conducts conversion for digital signals and analog signals both connected to public lines PN.

Host computer 21 of a service company, in this case, can learn occurrence of troubles and maintenance timing by reading information from the image forming apparatus 11. However, it is difficult, on the grounds of security, to read data by accessing the image forming apparatus 11 or the host computer 21 from the outside (an internet side), because proxy servers 12 and 22 have a fire wall function. In the administration system related to the present embodiment, therefore, data transmission between the image forming apparatus 11 and the host computer 21 is made possible by providing relay server 31.

Namely, in many cases, proxy servers 12 and 22 allow data transmission from intranets Nu and Ns and data downloading. When the specific data shown in FIG. 3 needs to be acquired from the image forming apparatus 11, on the host computer 21 side by utilizing the foregoing, for example, the host computer 21 transmits to relay server 31 the job information (first transmission information) to the effect that the host computer 21 desires to acquire data from the image forming apparatus 11 to make the relay server 31 to store that information.

Then, when the image forming apparatus 11 has access to the relay server 31, if the job information (first transmission information) to the effect that the host computer 21 desires to acquire data from the image forming apparatus 11 is stored in the relay server 31, the image forming apparatus 11 reads this information and transmits specific data (second transmission information) to make the relay server 31 to store the data. Further, when the host computer 21 has access to the relay server 31, if the specific data (second transmission information representing also apparatus data information) transmitted from the image forming apparatus 11 are stored in the relay server 31, the host computer 21 can read the data.

Namely, the job information turns into transmission instruction information for the image forming apparatus 11 to transmit second transmission information (specific data) to relay server 31, and thereby, the image forming apparatus 11 can transmit the second transmission information to the relay server 31 based on the transmission instruction information in the acquired first transmission information. Incidentally, it is preferable that a relay storage section of the relay server 31 can store a plurality of first transmission information.

Since data transmission is possible without direct access between the image forming apparatus 11 and the host computer 21, the host computer 21 can monitor the image forming apparatus 11 appropriately independently of whether a fire wall exists or not. Examples of the second transmission information are shown in FIG. 3, and one example of them is represented by at least one of those including the number of times of image forming (total count in FIG. 3), the number of times of the use of at least one constituent element (photoreceptor drum) constituting the image forming apparatus 11 (drum count, optional replacement part count, fixed replacement part count), the number of times of image forming for each size of recording material (count for each size of paper (recording material)), the number of sheets of image-formed recording material (recording material count), and the number of times of image forming for each function (mode) owned by image forming apparatus 11 (count for each user use mode and count for each of copy, printer, FAX and scanner). The second transmission information may also be represented by urgent information (urgent/periodic call information shown in FIG. 3) and error information (JAM/SC information) based on abnormality caused on image forming apparatus 11.

Namely, when occurrence of some abnormality or other is detected by a detecting means in the image forming apparatus 11, and when a trouble type judging means judges that the abnormality detected by the detecting means is urgent, urgency information is transmitted to relay server 31. Since this urgency information is read by the host computer 21 which has accessed the relay server 31, a service company can learn that abnormality has been caused in the image forming apparatus 11. Operations in this case will be described later, referring to FIG. 5.

Further, the image forming apparatus 11 is administrated by the host computer 21 connected to internet N and has a relay storage section that stores first transmission information transmitted from the host computer 21 to the image forming apparatus 11, thus the image forming apparatus 11 can acquire the first transmission information stored in the relay storage section by accessing the relay server 31 connected to internet N through internet N, and it can update programs and data by utilizing the acquired first transmission information. It is therefore possible for the image forming apparatus 11 to change controlling operations based on the updated data. Namely, it is possible to change control operations of the image forming apparatus 11 from the location (for example, a service company) that is far from the image forming apparatus 11, which is convenient.

Incidentally, by giving unique objective machine ID information (serial number to be more concrete) to image forming apparatus 11 and host computer 21, information transmission between specific image forming apparatus 11 and specific host computer 21 is made to be possible by discriminating transmission information by the use of the objective machine ID information even when plural image forming apparatuses 11 and host computers 21 exist and only one relay server 31 exists.

By including the objective machine ID information that specifies image forming apparatuses 11 representing a target for transmission in the first transmission information, the image forming apparatuses 11 accesses relay server 31 and judges whether to acquire the first transmission information based on the objective machine ID information or not, and when a judgment is formed to acquire, the first transmission information stored in a relay storage section of relay server 31 is acquired.

Further, if the host computer 21 which has transmitted first transmission information or the image forming apparatuses 11 which has transmitted second transmission information accesses relay server 31 after transmitting, for confirming whether the relay server 31 has received the first transmission information or the second transmission information normally or not, it is possible to confirm whether the information has been transmitted normally or not, which is preferable.

In this case, the host computer 21 that has transmitted the first transmission information or the image forming apparatuses 11 which has transmitted the second transmission information accesses relay server 31 to confirm whether the relay server 31 has received the first transmission information or the second transmission information normally or not, and when the information has not been received normally, the first transmission information or the second transmission information is transmitted again, and thus, delivery and receipt of information can be conducted more firmly.

Incidentally, the host computer 21 or the image forming apparatus 11 accesses relay server 31 in at least one timing out of those including each prescribed time interval, prescribed time, prescribed timing and the timing satisfying prescribed conditions. In this case, the "prescribed time" is the time established in advance such as, for example, ? o'clock, ? o'clock on ? weekday every week and ? o'clock on ?$^{th}$ day in every month. An example of the "prescribed timing" is the starting time for the administrated apparatus or the moment when the prescribed operation was conducted. Further, an example of the "timing satisfying prescribed conditions" is the moment when the number of times of image forming has arrived at the frequency established in advance, or the moment when the abnormality information established in advance among pieces of abnormality information detected has been detected. Incidentally, in the embodiment described below, the host computer 21 or the image forming apparatus 11 is arranged to access relay server 31 at prescribed intervals. In the present embodiment, the host computer 21 accesses at 10-minute intervals and the image forming apparatus 11 accesses at 15-minute intervals. Namely, an interval between a certain access of the image forming apparatus 11 to the relay server 31 and the succeeding access is longer than that between a certain access of the host computer 21 to the relay server 31 and the succeeding access. If the access interval of the host computer 21 is shorter than that of the image forming apparatus 11, when urgency notification comes from the image forming apparatus 11, this urgency notification can be learned quickly, which is preferable. Incidentally, the access interval of the image forming apparatus 11 can be changed. For example, it can be changed from an operation section of the image forming apparatus 11, a personal computer connected to a user network, or from a host computer.

Figure 2:
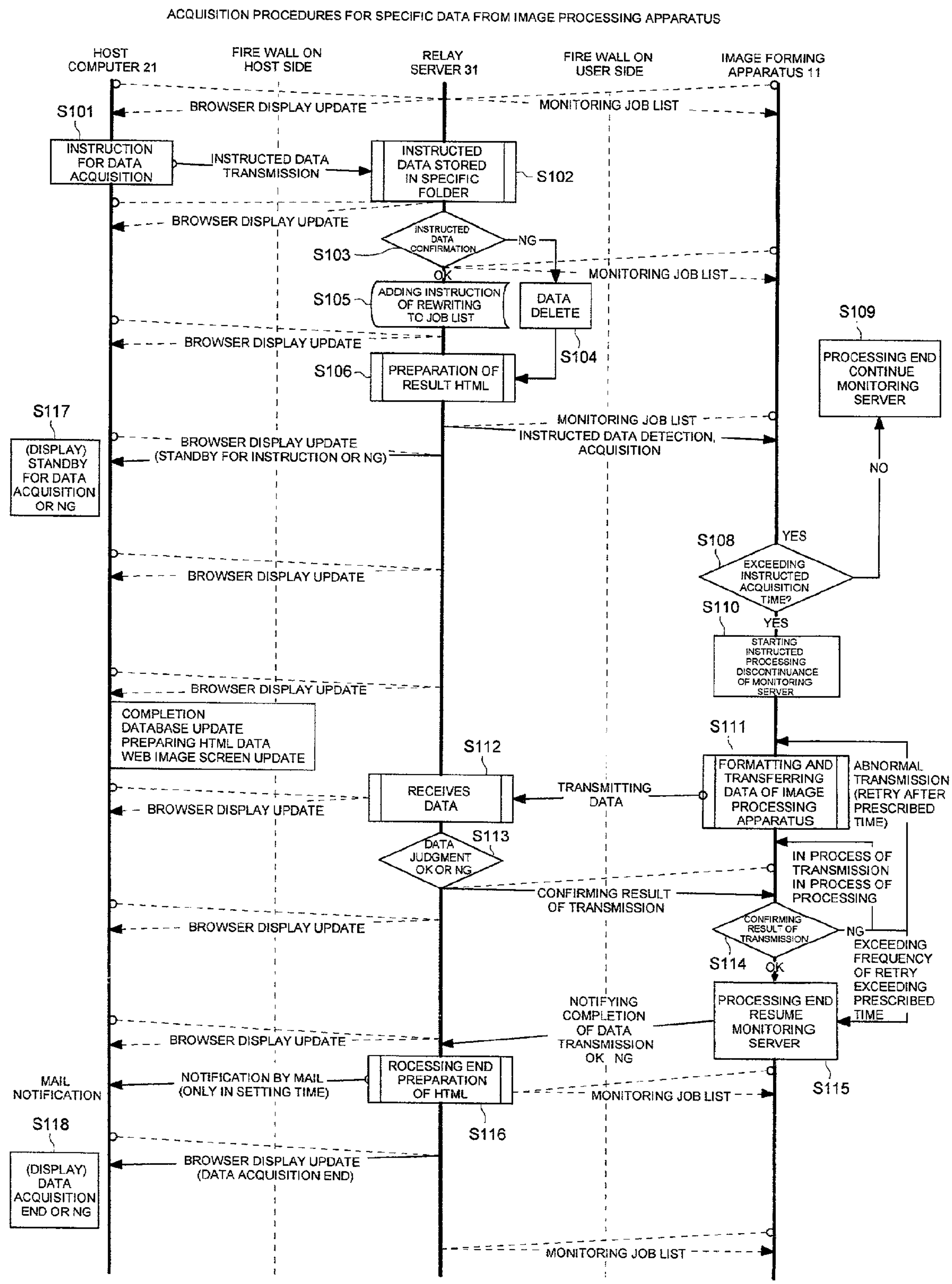
FIG. 2 is a ladder chart showing data transmission between image forming apparatus 11 and host computer 21.

Data transmission between the image forming apparatus 11 and the host computer 21 will be explained more concretely. FIG. 2 is a ladder chart showing data transmission between the image forming apparatus 11 and host computer 21, and it shows an occasion wherein specific data are acquired from the image forming apparatus 11 side. FIG. 3 is a diagram showing an example of specific data. FIG. 4 shows an example wherein a job list stored in a relay storage section is displayed on a display section on the host computer 21 side (contents thereof may be described later).

Incidentally, let is be assumed that the image forming apparatus 11 accesses relay server 31 periodically to monitor an instruction (representing first transmission information and job information) written in the relay storage section of the relay server 31, and the host computer 21, on the other hand, accesses the relay server 31 periodically to update information displayed on a display section.

In step S 101 in FIG. 2, an operation of a service engineer, for example, makes the host computer 21 to transmit instruction data (representing first transmission information, job information and transmission-instructing information) purporting that siphoning over specific data from the image forming apparatus 11 is desired (namely, making the image forming apparatus 11 to transmit specific data) to the relay server 31. In the aforesaid instruction data, there are included, at need, objective machine ID information for the image forming apparatus 11 and the time for the execution (the time for the image forming apparatus 11 to transmit specific data to relay server 31).

Relay server 31 stores the instruction data received by the relay server 31 in the specific area of a relay storage section in step S 102, and then, confirms whether the received instruction data are normal or not. If the instruction data are not normal, the data are eliminated in step S 4. If the instruction data are normal, on the other hand, the relay server 31 writes the instruction data of specific data on the job list and stores them in a specific folder corresponding to the serial number (objective machine ID information) specific to the image forming apparatus 11, in step S 105. The results of them are converted into formats such as HTML, XML and FTP to wait for access from the image forming apparatus 11 and host computer 21. The host computer 21 reads out data from the relay server 31 in the next access, and indicates, on its display section 21*a* (FIG. 1), a display of standby for data acquisition or a display of faulty instruction data (step S 117).

Namely, the relay server 31 changes information displayed on display section 21*a* of host computer 21, depending on whether the image forming apparatus 11 has acquired first transmission information or not and on whether the image forming apparatus 11 has conducted prescribed operations based on the first transmission information or not, while, the host computer 21 accesses periodically the relay server 31 at the timing of each prescribed interval, and it acquires information indicated on display section 21*a* of the host computer 21 to display it on the display section 21*a*. Examples of displays on the display section 21*a* will be described later, referring to FIG. 4.

After that, the image forming apparatus 11 accesses the relay server 31 to check a specific folder corresponding to a specific serial number (objective machine ID information) in JOB list, and when it discovers the instruction data for itself, it acquires the instruction data and judges whether the instructed time (time to execute) has passed or not (step S 108). If it judges that the instructed time has not passed, the image forming apparatus 11 completes the processing and continues periodic access to relay server 31 (step S 109).

If the instructed time is judged to have passed, on the contrary, the image forming apparatus 11 discontinue the periodic access to the relay server 31 (step S 110), and conducts only processing of the acquired instruction. To be concrete, the image forming apparatus 11 converts its specific data into prescribed format of protocol which can pass through a user fire wall such as, for example, HTML, XML and FTP, in step S 111, and transmits it to relay server 31 as second transmission information (apparatus data information).

On the other hand, the relay server 31 receives specific data transmitted from the image forming apparatus 11 (step S 112), then, judges whether the data have been transmitted normally or not in step S 113, and writes the results of them in the relay storage section. After transmission of the specific data, the image forming apparatus 11 accesses relay server 31 after the lapse of prescribed time to confirm the results of the data transmission. In step S 114, the image forming apparatus 11 returns to step S 111 again if the results of transmission of the received data are faulty, and transmits again. On the other hand, if the results of transmission of data are appropriate, transmission processing for specific data based on instruction data is completed in step S 115, and periodic access of the relay server 31 is started again.

Incidentally, when transmission processing is completed (including an occasion where data transmission is impossible, such as transmission is repeated plural times to exceed the prescribed times determined in advance or to exceed the stipulated time determined in advance), a notification of completion of data transmission (a completion notification showing the completion of prescribed operations, and OK represents that data transmission was possible, and NG represents that data transmission was impossible) is transmitted to relay server 31 from the image forming apparatus 11. In the relay server 31, data to the effect that data transmission was completed normally or data to the effect that data transmission was impossible are written in the prescribed area, in accordance with a notification for completion of data transmission from the image forming apparatus 11 (step S 116, see FIG. 4). Then, in the case of normal completion, the transmitted specific data of the image forming apparatus 11 are stored in the prescribed area of the relay storage section so that they may be downloaded from host computer 21. Incidentally, if notification by mail is established, it is possible to transmit to host computer 21 quickly by making the host computer 21 to be contacted immediately (further, it is possible to transmit simultaneously to plural host computers 21 and service engineers, by setting a plurality of addresses), which is preferable. However, when the host computer 21 accesses relay server 31 next time, whether the transmission from the image forming apparatus 11 based on the instruction data has been completed normally or not is indicated on display section 21*a* of host computer 21 (step S 118), and further, when the transmission is completed normally, specific data of the image forming apparatus 11 stored in the relay storage section are read to be capable of being displayed on the display section, or downloaded.

Figure 5:
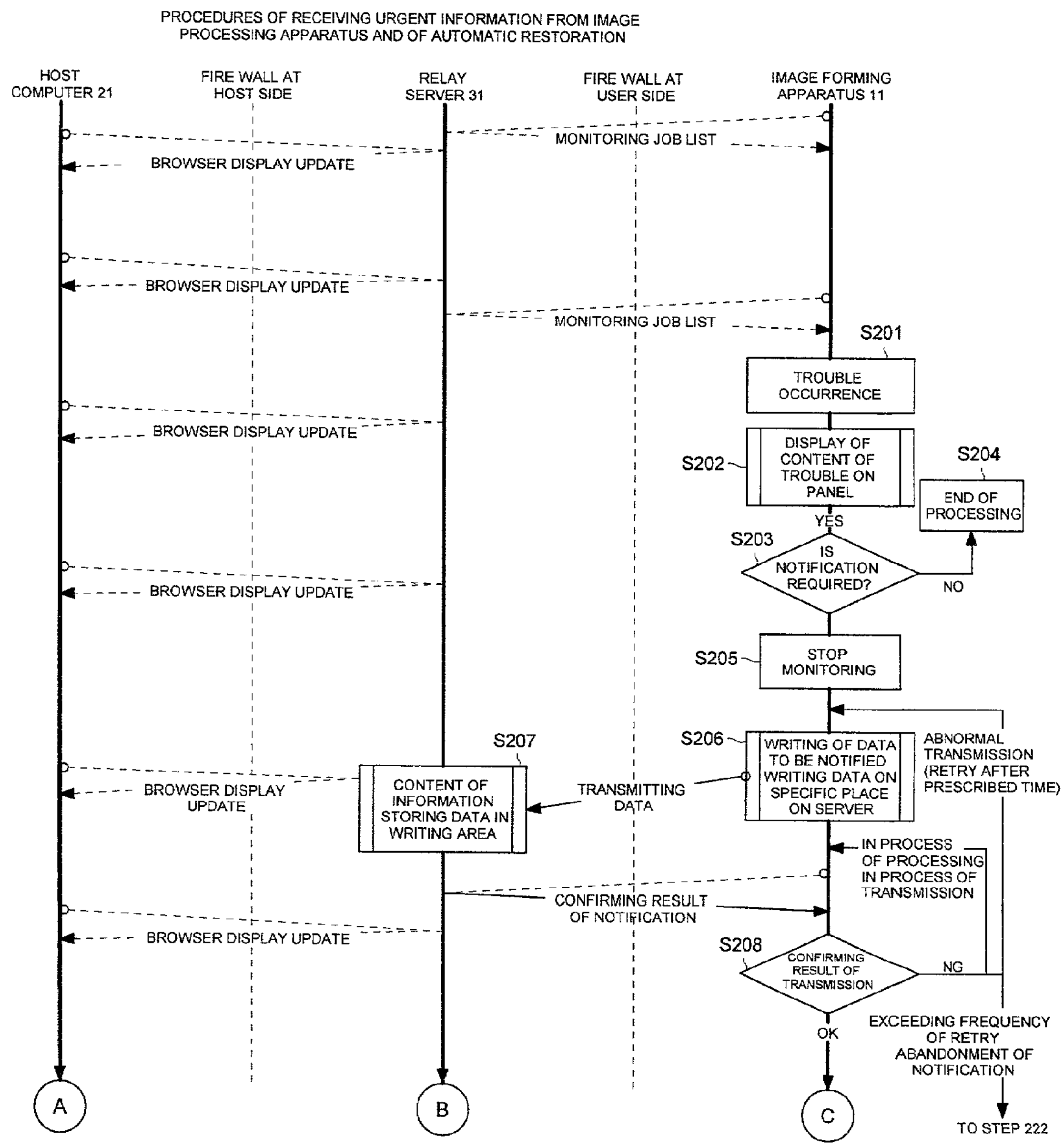
FIG. 5 is a ladder chart showing data transmission between image forming apparatus 11 and host computer 21.
Figure 6:
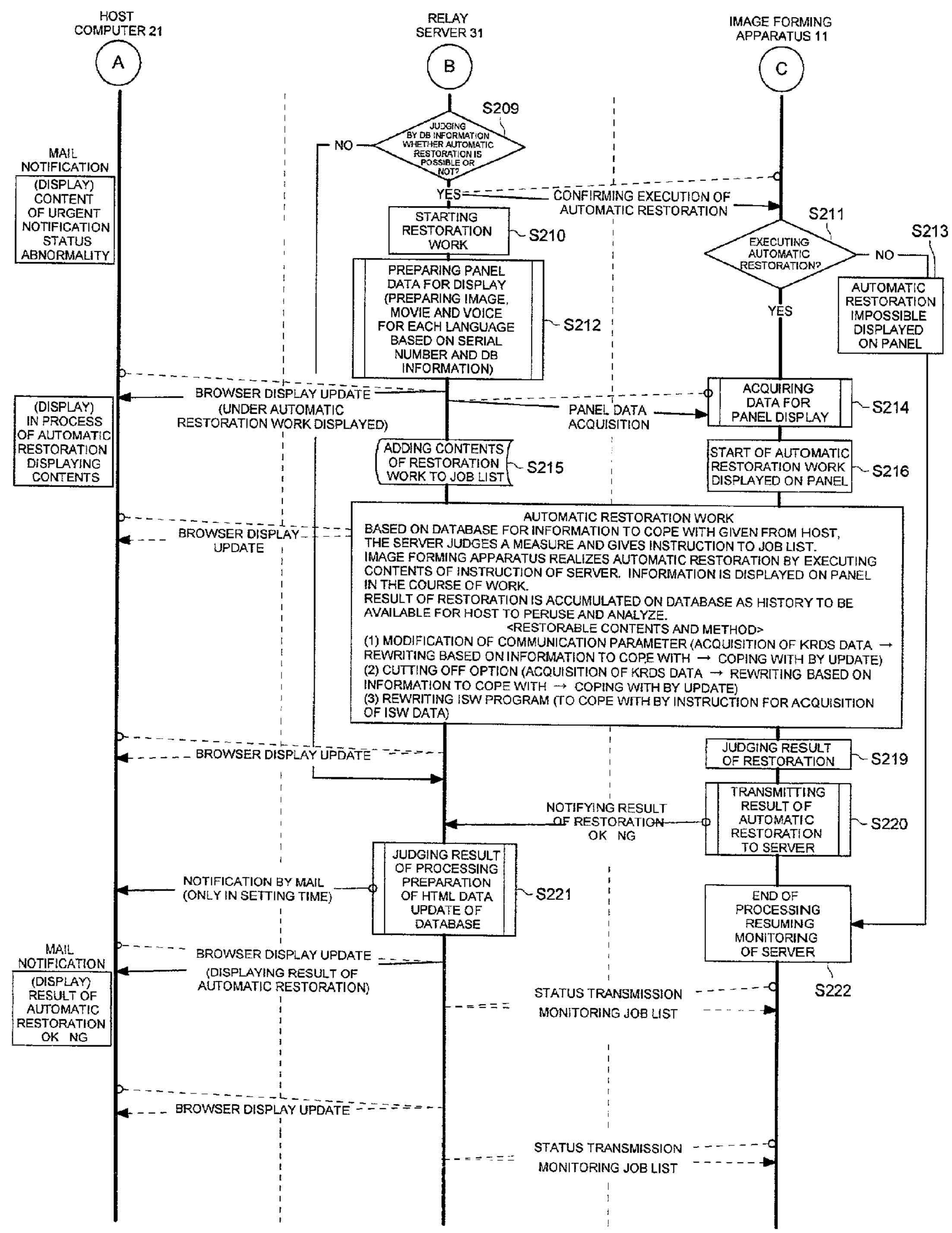
FIG. 6 is a ladder chart showing data transmission between image forming apparatus 11 and host computer 21.

Next, data transmission in the case of occurrence of troubles (abnormality) in image forming apparatus 11 and automatic restoration in the aforesaid case will be explained. Each of FIG. 5 and FIG. 6 is a ladder chart showing data transmission between image forming apparatus 11 and host computer 21, wherein troubles are caused on the image forming apparatus 11 side. Incidentally, in the embodiment described below, contents of the troubles are checked, and periodic access to relay server 31 is discontinued when the troubles are fatal. However, it is also possible to discontinue the periodic access immediately after trouble occurrence is detected. In the present embodiment, an administration means is composed of relay server 31 and host computer (administration apparatus) 21.

In step S 201 in FIG. 5, when a detection means detects that some troubles are caused, image forming apparatus 11 indicates that troubles are caused on a display panel (not shown) in step S 202, and stops execution of image forming operations if the image forming operations are in process. In addition, the image forming apparatus 11 carries out a self-diagnosis program by means of a trouble type judging means in step S 203, and judges whether the trouble caused is a temporary one like a sheet jam or it is a fatal one like motor troubles. When the trouble is judged to be a temporary one, the image forming apparatus 11 responds to clear the jammed sheet to restore the operations in step S 204, without notifying to the outside.

When the trouble caused is judged to be fatal, on the other hand, the image forming apparatus 11 discontinues periodic access to relay server 31 in step S 205, and acquires information about contents of the trouble in step S 206 to transmit it to the relay server 31. In this case, the image forming apparatus 11 transmits also objective machine ID information. The relay server 31 stores the information about contents of the trouble received by the relay server 31 in the prescribed storage area, in step S 207. After the lapse of prescribed time from transmission of the information about contents of the trouble, namely of trouble type information, the image forming apparatus 11 accesses relay server 31 to confirm the results of data transmission.

If the image forming apparatus 11 judges the results of transmission to be unsatisfactory in step S 208, it returns to step S 206 to transmit again. On the other hand, if the results of data transmission are satisfactory, the image forming apparatus 11 advances to automatic restoration work which will be explained below. Incidentally, in this step, the relay server 31 may send to host computer 21 a mail to the effect that the relay server 31 has received the trouble type information.

In the relay server 31, there is provided a database in which trouble type information and restoration information are stored to be corresponded to each other. In step S 209 in FIG. 6, the relay server 31 judges whether the trouble in the received trouble type information can be restored automatically or not, by referring to the database. If the trouble is judged to be impossible for automatic restoration, the relay server 31 prepares HTML data based on that judgment in step S 221 and updates the database to notify host computer 21 by mail.

On the other hand, if the trouble is judged to be possible for automatic restoration, the relay server 31 makes the image forming apparatus 11 to acquire a certification notice for implementation of automatic restoration when the image forming apparatus 11 accesses, and it further starts restoration work in step S 210. The relay server 31 prepares panel data for display for the image forming apparatus 11 based on the database in step S 212. The panel data for display represent data which are displayed on a display panel of the image forming apparatus 11 and show that automatic restoration work will be conducted, and they include data for serial numbers, languages of various countries relating to measures for troubles, images (including movies) and voices.

Thereafter, the image forming apparatus 11 accesses the relay server 31 in step S 214, and the image forming apparatus 11 acquires panel data for display including its serial number, then, displays the data in step S 216, and starts automatic restoration work. A user who has observed the display learns that the automatic restoration work will be started. Therefore, the user can prevent that he or she touches the image forming apparatus 11 carelessly or disturbs the automatic restoration work. On the other hand, the relay server 31 adds contents of restoration work to JOB list in step S 215.

The automatic restoration work is conducted in a way wherein relay server 31 itself decides measures based on measure information database given from host computer 21, and gives instructions to JOB list. The image forming apparatus 11 executes contents of the instructions given by the server, and thereby realizes automatic restoration. In the course of the restoration work, information about the restoration work is displayed on the display panel of the image forming apparatus 11. With respect to the results of restoration, they are stored in relay server 31 to become a part of the database, and then, they may be read in the case of access from host computer 21, which makes trouble analyses possible. Incidentally, as a concrete method for restoration, there are considered a change of communication parameter (by acquiring data from host computer 21, then, rewriting based on trouble measure information and by updating), disconnection of options (by acquiring data from host computer 21, then, rewriting based on trouble measure information and by updating) and rewriting of ISW data (by instructions to acquire ISW data).

For example, when information showing that a temporary trouble such as a sheet jam is caused on the same location and on the same day is obtained from a database history, it is judged to be possible to prevent occurrence of troubles by adjusting a sheet advancing speed after specifying frequency and locations of occurrence. In that case, it is possible to carry out the restoration by rewriting adjustment values.

When it is judged that the whole apparatus cannot be used not because of a trouble of an administration apparatus but because of troubles of options, options are changed in terms of setting and are disconnected temporarily, which makes it impossible to use options. In that case, it is possible to use an image forming apparatus under the condition that broken options have been disconnected from the image forming apparatus, by changing parameters of connection information that connects options.

In step S 219, the image forming apparatus 11 judges whether the automatic restoration work was satisfactory or not, and in step S 220, it transmits the results of the automatic restoration work to relay server 31. After that, the image forming apparatus 11 completes the restoration work, and starts monitoring the server again in step S 222.

The relay server 31 which has received the results of the automatic restoration work from the image forming apparatus 11 prepares HTML data based on the aforesaid results in step S 221, then, updates the database, and notifies it host computer 21 by mail. After that, the host computer 21 which has accessed the relay server 31 changes a browser display, and displays the results of the automatic restoration work. In this case, it is known that the automatic restoration was impossible, and an appropriate action such as dispatch of a service engineer can be taken accordingly.

FIG. 4 is a diagram showing an example of JOB list displayed on a display section of host computer 21. Incidentally, each item of the JOB list has the following meaning.

Serial number: Serial number (determined uniquely) of image forming apparatus 11

Location of installation: Place where image forming apparatus 11 is installed Contents of instruction: Job instruction contents such as GETDATA (data acquisition) and UPDATE (updating)

Type of data: Types of data to be acquired and updated by contents of instruction (KRDS (updating) data, ISW data (updating program))

Administration server: IP address and domain name (parent relay server when relay server is arranged stepwise) of relay server 31 that administrates job Instructing host: ID information (unique host ID information (serial number)) of host computer 21 giving job instruction Instruction time: Time to execute contents of instruction (time to start acquiring updated data for image forming apparatus 11 when updating data)

Execution time: Time for image forming apparatus 11 to execute updating in the case of updating State of processing: State of communication between image forming apparatus 11 and relay server 31 is displayed, and it can be grasped on the host side. Concrete examples are as follows.

(Under standby) Waiting for access from copying machine, or waiting for instruction (In process of data acquisition) State wherein image forming apparatus 11 is on standby until execution time for data updating (data have been acquired)

(Normal end) Data processing is completed normally (display eliminated after a certain period of time)

(Abnormal end) Data processing fails (display not eliminated)

A service engineer can judge the state of plural image forming apparatuses 11 correctly by observing the display screen in FIG. 4 which is updated periodically.

Incidentally, with respect to administration mode for JOB list, a folder is prepared for each serial number of each image forming apparatus 11 in host computer 21 or in a hard disc of relay server 31, for example, and it is possible to pick up necessary JOB list by searching a folder corresponding the serial number of the image forming apparatus 11 to be grasped in terms of state. Further, the image forming apparatus 11 can be conduct elimination or correction automatically for those where execution of JOB seems to have been completed, by searching, from its specific serial number, the specific folder of JOB list.

Though the invention has been explained above referring to the embodiment, the invention should not be construed to be limited to the embodiment, and it can naturally be modified or improved. For example, the database composed of trouble type information and restoration information may also be provided in host computer 21. In addition, the invention can be applied in the presence or absence of a fire wall.

What is claimed is:

1. An apparatus administration system, comprising:

an administrated apparatus located in a first local network and connected to the Internet through a first firewall server of the first local network;

an administrating apparatus located in a second local network and connected to the Internet through a second firewall server of the second local network; and a relaying server located outside the first and second local networks and connected to the Internet for enabling the administrated apparatus and the administrating apparatus to indirectly communicate with each other via the Internet;

wherein the administrated apparatus comprises: a transmitting section which transmits trouble type information to the relaying server through the first firewall server and the Internet, an accessing section which accesses the relaying server and obtains restoration work information based on the trouble type information from the relaying server through the first firewall server and the Internet, and a control section which controls the administrated apparatus to conduct an automatic restoration process in accordance with the restoration work information;

wherein the restoration work information is provided to the relaying server by the administrating apparatus through the second firewall server and the Internet; and wherein the relaying server comprises a memory which stores the trouble type information transmitted from the administrated apparatus.

2. The apparatus administration system of claim 1, further comprising a database which stores a plurality of items of trouble type information and a plurality of items of restoration work information in correspondence with each other.

3. The apparatus administration system of claim 2, wherein each of the items of trouble type information is classified as corresponding to one of a restorable trouble and a non-restorable trouble, and the stored items of restoration work information correspond to the items of trouble type information classified as being restorable.

4. The apparatus administration system of claim 2, wherein the relaying server provides the corresponding restoration information for retrieval by the administrated apparatus based on the trouble type information received from the administrated apparatus.

5. The apparatus administration system of claim 3, wherein the relaying server judges whether or not the administrated apparatus is able to conduct the automatic restoration process by itself by accessing the database.

6. The apparatus administration system of claim 1, wherein when the automatic restoration process is carried out, the transmitting section of the administrated apparatus transmits result information specifying a result of the automatic restoration process to the relaying server.

7. The apparatus administration system of claim 6, wherein the administrating apparatus accesses the relaying server to obtain the result information.

8. The apparatus administration system of claim 2, wherein the relaying server comprises the database.

9. The apparatus administration system of claim 2, wherein the administrating apparatus comprises the database.

10. The apparatus administration system of claim 1, wherein the administrated apparatus further comprises:

a detecting section which detects when a trouble occurs in the administrated apparatus; and a judging section which determines a kind of the trouble; and wherein the administrated apparatus transmits the trouble type information in accordance with the determined kind of the trouble.

11. The apparatus administration system of claim 1, wherein the restoration work information is periodically updated.

12. An administrated apparatus for an apparatus administration system that includes:

(i) the administrated apparatus located in a first local network and connected to the Internet through a first firewall server of the first local network, (ii) an administrating apparatus located in a second local network and connected to the Internet through a second firewall server of the second local network, and (iii) a relaying server located outside of the first and second firewall servers and connected to the Internet for enabling the administrated apparatus and the administrating apparatus to indirectly communicate with each other via the Internet, the administrated apparatus comprising:

a transmitting section which transmits trouble type information to the relaying server through the first firewall server and the Internet, wherein the trouble type information is retrieved from the relaying server by the administrating apparatus through the Internet;

an accessing section which accesses the relaying server and retrieves restoration work information from the relaying server through the Internet, wherein the restoration work information has been transmitted from the administrating apparatus to the relaying server through the second firewall server and the Internet based on the trouble type information; and a control section which controls the administrated apparatus to conduct an automatic restoration process in accordance with the restoration work information.

13. The administrated apparatus of claim 12, further comprising:

a trouble type judging section which detects a trouble occurring in the administrated apparatus, which judges a type of the trouble, and which generates trouble type information.

14. The administrated apparatus of claim 12, wherein when the automatic restoration process is carried out, the transmitting section transmits result information specifying a result of the automatic restoration process to the relaying server.

15. An administrating apparatus for an apparatus administration system that includes:

(i) an administrated apparatus located in a first local network and connected to the Internet through a first firewall server of the first local network, (ii) the administrating apparatus located in a second local network and connected to the Internet through a second firewall server of the second local network, and (iii) a relaying server located outside of the first and second firewall servers and connected to the Internet for enabling the administrated apparatus and the administrating apparatus to indirectly communicate with each other via the Internet, the administrating apparatus comprising:

an accessing section which accesses the relaying server and retrieves trouble type information from the relaying server through the second firewall server and the Internet, wherein the trouble type information has been transmitted from the administrated apparatus to the relaying server through the Internet; and a transmitting section which transmits restoration work information to the relaying server through the Internet, wherein the restoration work information corresponds to the trouble type information and is transmitted to the relaying server for retrieval by the administrated apparatus from the relaying server through the first firewall server and the Internet.

16. The administrating apparatus of claim 15, wherein the administrating apparatus accesses the relaying server to obtain result information regarding an automatic restoration process conducted by the administrated apparatus based on the restoration work information.

17. The administrating apparatus of claim 15, wherein the administrating apparatus updates the restoration work information.

* * * * *